United States Patent
Foster et al.

(10) Patent No.: US 10,188,021 B2
(45) Date of Patent: Jan. 29, 2019

(54) PATH PLANNING SYSTEM FOR AUTONOMOUS OFF-ROAD VEHICLES

(71) Applicants: CNH INDUSTRIAL AMERICA LLC, New Holland, PA (US); AUTONOMOUS SOLUTIONS, INC, Mendon, UT (US)

(72) Inventors: Christopher Alan Foster, Mohntom, PA (US); John Henry Posselius, Ephrata, PA (US); Nathan Eric Bunderson, Providence, UT (US); Taylor Chad Bybee, Logan, UT (US); Daniel John Morwood, Petersboro, UT (US); Bret Todd Turpin, Wellsville, UT (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 31 days.

(21) Appl. No.: 15/627,074

(22) Filed: Jun. 19, 2017

(65) Prior Publication Data

US 2018/0359904 A1 Dec. 20, 2018

(51) Int. Cl.
*A01B 69/00* (2006.01)
*A01B 69/04* (2006.01)
*G05D 1/02* (2006.01)
*G06Q 10/04* (2012.01)
*G05D 1/00* (2006.01)

(52) U.S. Cl.
CPC ......... *A01B 69/008* (2013.01); *G05D 1/0223* (2013.01); *G06Q 10/047* (2013.01); *G05D 1/0088* (2013.01); *G05D 2201/0201* (2013.01)

(58) Field of Classification Search
CPC .. A01B 69/008; G05D 1/0223; G05D 1/0088; G05D 2201/0201; G06Q 10/047
See application file for complete search history.

(56) References Cited

U.S. PATENT DOCUMENTS

| | | | |
|---|---|---|---|
| 6,236,916 | B1 | 5/2001 | Staub et al. |
| 7,110,881 | B2 | 9/2006 | Gray et al. |
| 7,228,214 | B2 | 6/2007 | Flann et al. |
| 7,844,396 | B2 | 11/2010 | Zeitzew |
| 8,498,788 | B2 | 7/2013 | Kondekar |
| 8,781,693 | B2 | 7/2014 | Woodcock |

(Continued)

*Primary Examiner* — Calvin Cheung
(74) *Attorney, Agent, or Firm* — Rebecca L. Henkel; Rickard K. DeMille

(57) ABSTRACT

A swath tracking system for an off-road vehicle includes a control system with a processor and a memory. The control system is configured to receive a plurality of vehicle location points and a current vehicle state, wherein the current vehicle state comprises a current vehicle location, generate a planned vehicle path through one or more of the plurality of vehicle location points, generate a correction path from the current vehicle location to a point along the planned vehicle path ahead of the current vehicle location along a direction of travel, generate a blended path by blending the planned vehicle path and the correction path based at least in part on an assigned weight, wherein the assigned weight is based at least in part on a heading error, a distance between the current vehicle location and the planned path, or a combination thereof, and guide the off-road vehicle along the blended path.

20 Claims, 6 Drawing Sheets

(56) References Cited

U.S. PATENT DOCUMENTS

| | | | |
|---|---|---|---|
| 2013/0282423 A1* | 10/2013 | Hori | G06Q 50/02 705/7.25 |
| 2014/0121807 A1* | 5/2014 | Jung | G06Q 10/06313 700/115 |
| 2015/0186387 A1* | 7/2015 | Funabashi | G06Q 50/02 707/723 |

* cited by examiner

PATH PLANNING SYSTEM FOR AUTONOMOUS OFF-ROAD VEHICLES

BACKGROUND

The disclosure relates generally to off-road vehicle guidance systems, and more particularly to a path planning system for off-road vehicles.

Off-road vehicles, such as agricultural tractors, are typically manually guided through a field (e.g., via input from a driver). That is, an operator controls the steering and speed of an off-road vehicle from within a cab. Recent developments integrating GPS-based navigation systems into agricultural vehicle control systems have enabled automatic or semi-automatic steering modes. For example, some agricultural vehicles may include a control system configured to automatically direct the vehicle to follow a path between, over, or adjacent to rows in a field. The strip formed by the width of the vehicle and/or implement as the vehicle follows the path may be referred to as a swath or pass.

In some cases, multiple off-road vehicles may be operating in the same geographic area or field, such as an agricultural field. The off-road vehicles may be towing agricultural implements of the same type or of different types, such as planters, harvesters, fertilizer application equipment, and so on. It may be useful to provide for improve path planning systems for one or more off-road vehicles.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment, a path planning system for off-road vehicles includes a processor. The processor is configured to receive, via a plan requestor and executor system, a plan request and to derive, via a swath and partition generator system, a set of partitions and a set of swaths corresponding to the set of partitions based on the plan request. The processor is further configured to generate a partition hierarchy based on the set of partitions and a map of a field, and to assign, via a swath connector, costs to potential connections between swaths in the set of swaths. The processor is additionally configured to derive a first vehicle plan based on the costs to the potential connections between swaths, wherein the first vehicle plan comprises a first path for a first off-road vehicle to operate in the field.

In another embodiment, method of path planning for off-road vehicles includes receiving, via a plan requestor and executor system, a plan request, and deriving, via a swath and partition generator system, a set of partitions and a set of swaths corresponding to the set of partitions based on the plan request. The method further includes generating a partition hierarchy based on the set of partitions and a map of a field, and assigning, via a swath connector, costs to potential connections between swaths in the set of swaths. The method additionally includes deriving a first vehicle plan based on the costs to the potential connections between swaths, wherein the first vehicle plan comprises a first path for a first off-road vehicle to operate in the field.

In a further embodiment, a tangible, non-transitory computer readable medium includes instructions configured to receive, via a plan requestor and executor system, a plan request and to derive, via a swath and partition generator system, a set of partitions and a set of swaths corresponding to the set of partitions based on the plan request. The instructions are further configured to generate a partition hierarchy based on the set of partitions and a map of a field, and to assign, via a swath connector, costs to potential connections between swaths in the set of swaths. The instructions are additionally configured to derive a first vehicle plan based on the costs to the potential connections between swaths, wherein the first vehicle plan comprises a first path for a first off-road vehicle to operate in the field.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The techniques described herein provide for an autonomous vehicle, modular path planning system. In one embodiment, the path planning system includes a modular system architecture, as further described below, with components that may be communicating, for example, in real-time. The modular path planning system may derive a plan that enables one or more off-road vehicles to more efficiently operate on a field, such as an agricultural field. In certain embodiments, a multi-stage approach may executed via the modular path planning system to generate a plan to accomplish desired agricultural operations with given resources, e.g., off-road vehicle(s), agricultural implements, agricultural supplies (e.g., seed, fertilizer, etc.), field geography, and so on. The plan may then be updated, for example during operations of the off-road vehicle(s), to account for changes such as changed field conditions, weather, and the like, and an updated plan executed. In this manner, one or more off-road vehicles may be operated more efficiently, improving agricultural operations.

Figure 1:
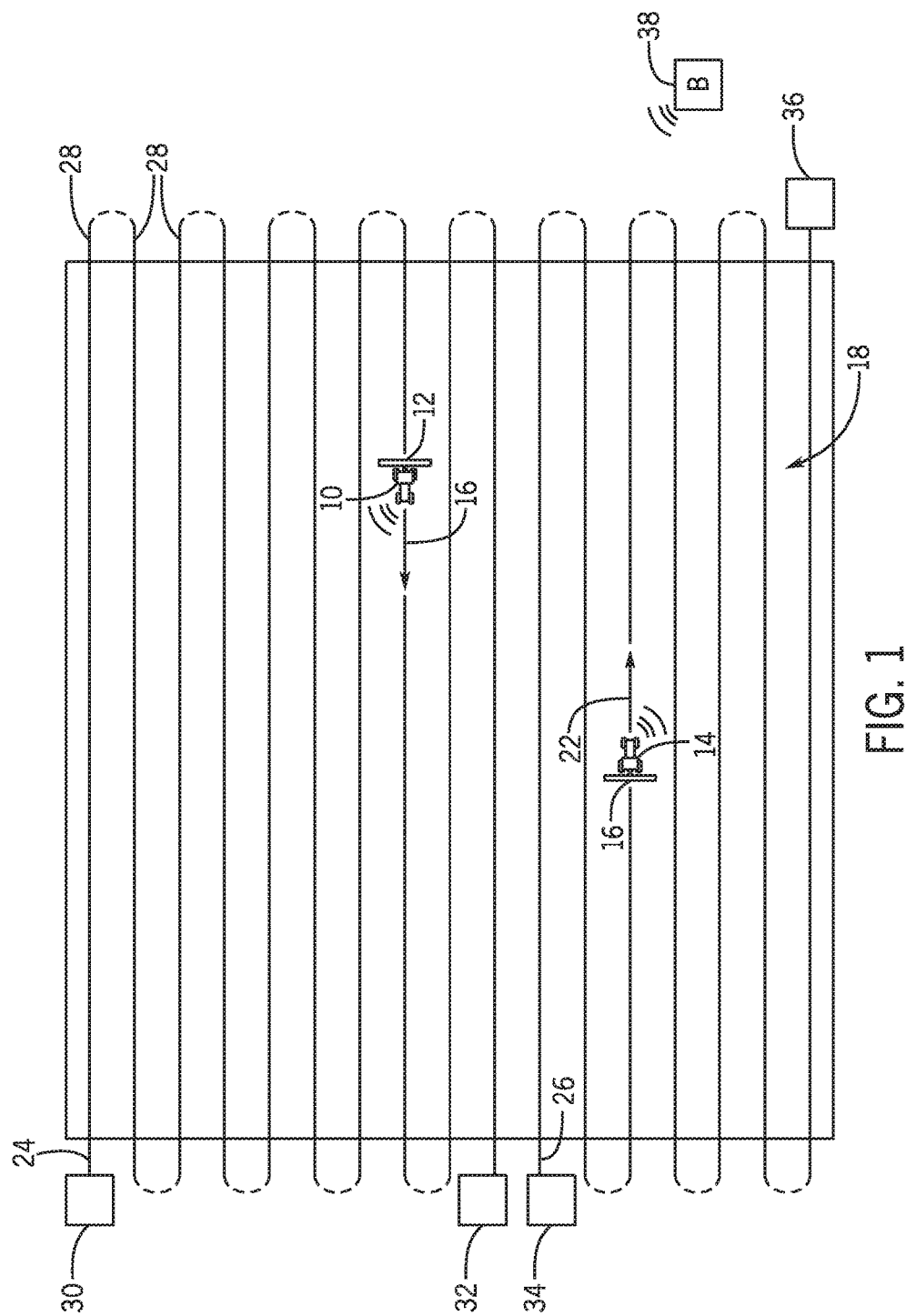
FIG. 1 is a schematic diagram of an embodiment of off-road vehicles and agricultural implements within an agricultural field.

Turning now to FIG. 1, the figure is a schematic diagram of an embodiment of a first off-road vehicle 10 and an agricultural implement 12, and a second off-road vehicle 14 and an agricultural implement 16 within an agricultural field 18. The off-road vehicles 10 and 14 (e.g., tractor or other prime mover) are configured to tow the agricultural implements 12 and 16 throughout the field 18 along a direction of travel 20 and 22, respectively. In certain embodiments, the off-road vehicles 10, 14 are directed (e.g., via an automated system) along a path 24 and a path 26 to traverse the field 18 along substantially parallel rows 28. Path 24 starts at location 30 and ends at location 32, while path 26 starts at location 34 and ends at location 36. While two off-road vehicles 10, 14 are shown, it is to be understood that, in certain examples, a single off-road vehicle 10 or 12 may be used, and in other examples, three or more off-road vehicles 10 and/or 12 may be used.

As the vehicles 10, 14 tow the implements 12, 16 through the field 18 along paths 24, 26, the width of the implements 12, 16 each covers a respective swath through the field 18, as described in further detail below. In alternative embodiments, the off-road vehicles 10, 14 may be directed to traverse the field 18 along other routes (e.g., along a spiral path, etc.). As will be appreciated, the agricultural implements 12, 16 may be any suitable implement for performing agricultural operations throughout the field 18. For example, in certain embodiments, the agricultural implements 12, 16 may be a tillage tool, a fertilizer application tool, a seeding or planting tool, or a harvesting tool, among others. While the agricultural implements 12, 16 are towed by the off-road vehicle 10, 14 in the illustrated embodiment, it should be appreciated that in alternative embodiments, the agricultural implements 12, 16 may be integrated within the off-road vehicles 10, 14.

In certain embodiments, the off-road vehicles 10, 14 are configured to operate autonomously (e.g., without an operator present in a cab of the off-road vehicle 10, 14). Accordingly, an automatic system may direct the off-road vehicles 10 towing agricultural implement 12 and the off-road vehicle 14 towing agricultural implement 16 along the paths 24, 26 throughout the field 18 without direct control by an operator. In such embodiments, the autonomous off-road vehicles 10 and/or 14 may be configured to communicate with a base station 38. For example, in some embodiments, the off-road vehicles 10, 14 may receive plan data from the base station 38. The plan data may partition the field 18 into one or more partitions as described in more detail below, and may assign the off-road vehicles 10, 14 to the various partitions. Likewise, the plan data may derive certain swaths for each of the off-road vehicles 10, 14 to follow.

Furthermore, in certain embodiments, the off-road vehicles 10, 14 may be configured to operate semi-autonomously. For example, an operator within the cab may direct the off-road vehicle 10 and/or 14 to starting positions 30, 34 within or proximate to the field 18, and an automated system may direct the off-road vehicle 10 and/or 14 along the selected/planned route (e.g., the path 24, 26) through the field 18 while operator(s) monitors operation of the off-road vehicles 10, 14 and/or the implements 12, 16.

During operation, the off-road vehicle 10 may encounter changes conditions, such as overflowing ponds, muddy areas, and so on, and may also diverge from the planned paths 24, 26 or swath. This divergence may be due to operator inputs, geographical features in the field 18, an obstacle in the field 18, changes in the off-road vehicles' 10, 14 operation due to various field conditions (mud, slippery ground, large clods of dirt, etc.), and the like. An updated plan may be generated to account for the various changes in the field 18, field operations, operator inputs, and, so on.

Figure 2:
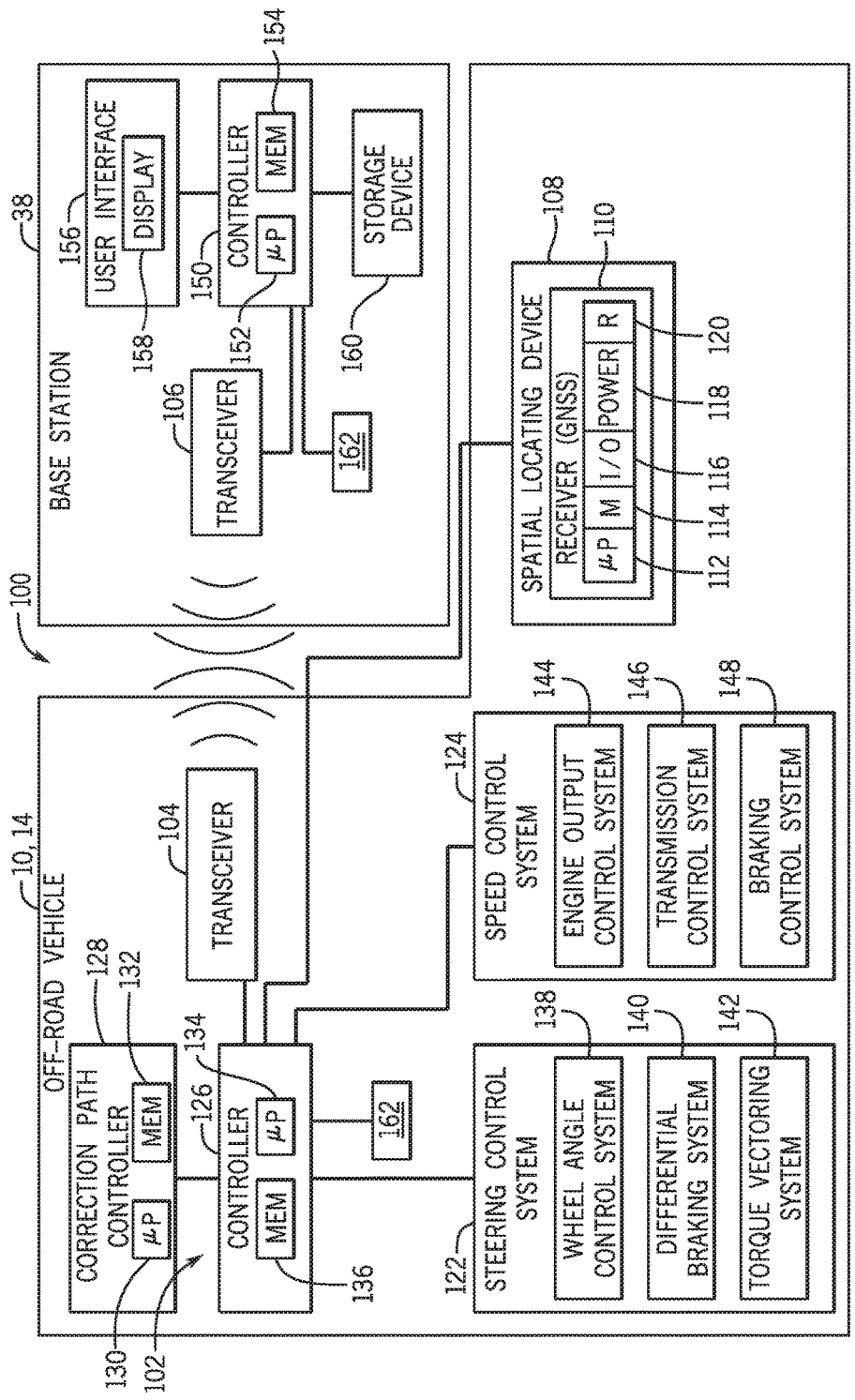
FIG. 2 is a schematic diagram of an embodiment of a control systems that may be utilized to control the off-road vehicles of FIG. 1.

FIG. 2 is a schematic diagram of an embodiment of an automated field operations system 100 that may be utilized to control the off-road vehicles 10 and/or 14 of FIG. 1. In the illustrated embodiment, the automated field operations system 100 includes a primary control system 102 (e.g., mounted on the off-road vehicles 10, 14), and the off-road vehicles 10, 14 includes a first transceiver 104 configured to establish a wireless communication link with a second transceiver 106 of the base station 38. As will be appreciated, the first and second transceivers 102, 104 may operate at any suitable frequency range within the electromagnetic spectrum. For example, in certain embodiments, the transceivers 102, 104 may broadcast and receive radio waves within a frequency range of about 1 GHz to about 10 GHz. In addition, the first and second transceivers 102, 104 may utilize any suitable communication protocol, such as a standard protocol (e.g., Wi-Fi, Bluetooth, etc.) or a proprietary protocol.

In the illustrated embodiment, the off-road vehicles 10, 14 includes a spatial locating device 108, which is mounted to the off-road vehicles 10, 14 and configured to determine positions of the off-road vehicles 10, 14. As will be appreciated, the spatial locating device 108 may include any suitable system configured to determine the positions of the off-road vehicles 10, 14, such as a global positioning system (GPS) or Global Navigation Satellite System (GLONASS), for example. The spatial locating device 108 is in communication with the primary vehicle control system 102. The spatial locating device 108 may include a Global Navigation Satellite System (GNSS) receiver 110 configured to communicate with two or more satellites in orbit (e.g., GPS, GLONASS, Galileo, BeiDou, etc.) to determine the location, heading, speed, etc. of the vehicles 10, 14. The receiver 110 may include one or more micro-processors 112, a memory component 114, an input/output system 116, a power supply 118, and radio circuitry 120. The processors 112 may run software stored on the memory component 114 to compute the positions of the vehicle 10, 14. Based on the computed position over time, the processor 112 may also determine vehicle 10, 14 heading, speed, etc. In some embodiments, the spatial locating device 108 may include a three-dimensional imaging system, such as a Lidar, which may be used in conjunction with the GNSS and configured to assist in determining a desired path and determining the vehicle's position and orientation relative to the path. Additionally, the spatial locating device 108 may include an augmentation system, such as Real Time Kinematic (RTK) or Wide Area Augmentation System (WAAS) to improve the accuracy of the spatial locating device 108.

In certain embodiments, the spatial locating device 108 may be configured to determine the positions of the off-road vehicle 10, 14 relative to a fixed point within the field (e.g., via a fixed radio transceiver 106). Accordingly, the spatial locating device 108 may be configured to determine the positions of the off-road vehicle 10, 14 relative to a fixed global coordinate system (e.g., via the GPS) or a fixed local coordinate system. In certain embodiments, the first transceiver 104 is configured to broadcast a signal indicative of the position of the off-road vehicles 10, 14 to the transceiver 106 of the base station 38. Based on the determined locations of the off-road vehicle 10, 14, the control system 102 may determine (e.g., via a processor) the relative proximity to one or more rows or swaths, one or more boundaries, one or more headlands, etc. Furthermore, the control system 102 may determine a planned path through points or curves received from the base station 38, and/or a correction path from the vehicle's current position back to the planned paths 24, 26.

In the illustrated embodiment, the off-road vehicles 10, 14 include a steering control system 122 configured to control direction of movement of the off-road vehicles 10, 14 and a speed control system 124 configured to control a speed of the off-road vehicles 10, 14. Furthermore, the control system 102 includes a controller 126 communicatively coupled to the first transceiver 104, to the spatial locating device 108, to the steering control system 122, and to the speed control system 124. In certain embodiments, the controller 126 may control the steering control system 122 and the speed control system 124 to guide the off-road vehicles 10, 14 along the planned path.

In further embodiments, the controller 126 is configured to control the steering control system 122 and the speed control system 124 to guide the off-road vehicles 10, 14 based on a path or paths planned via a modular path planning system. A correction path controller 128 is configured to receive the current vehicle state (e.g., position, velocity, heading, curvature, etc.), the planned path, and an estimated delay time of the control loop (e.g., to estimate the state of the vehicle when the vehicle actuates changes in the control signals). The correction path controller 128 may operate continuously to determine whether the vehicles 10, 14 are off the planned path. If so, the correction path controller 128 determines an error (e.g., a distance between the planned path and the current vehicle 10, 14 position or a heading error) and generates a continuous path for the vehicle 10, 14 to follow to a point along the planned path.

The correction path controller 128 includes a processor, such as the illustrated microprocessor 130, and a memory device 132. The correction path controller 128 may also include one or more storage devices and/or other suitable components. The processor 130 may be used to execute software, such as software for generating a correction path, and so forth. The processor 130 may include multiple microprocessors, one or more "general-purpose" microprocessors, one or more special-purpose microprocessors, and/or one or more application specific integrated circuits (ASICS), or some combination thereof. For example, the processor 130 may include one or more reduced instruction set (RISC) processors. The memory device 132 may include a volatile memory, such as random access memory (RAM), and/or a nonvolatile memory, such as ROM. The memory device 132 may store a variety of information and may be used for various purposes. For example, the memory device 132 may store processor-executable instructions (e.g., firmware or software) for the processor 130 to execute, such as instructions for generating a correction path. The storage device(s) (e.g., nonvolatile storage) may include ROM, flash memory, a hard drive, or any other suitable optical, magnetic, or solid-state storage medium, or a combination thereof. The storage device(s) may store data (e.g., target points, the planned path, etc.), instructions (e.g., software or firmware for controlling the off-road vehicle, etc.), and any other suitable data. In some embodiments, the tasks of the correction path controller 128 and the primary controller 126 may be performed by a single controller (e.g., the primary controller 126).

In certain embodiments, the controller 126 is an electronic controller having electrical circuitry configured to process data from the transceiver 104, the spatial locating device 108, the correction path controller 128, or a combination thereof, among other components of the off-road vehicles 10, 14. In the illustrated embodiment, the controller 126 includes a processor, such as the illustrated microprocessor 134, and a memory device 136. The controller 126 may also include one or more storage devices and/or other suitable components. The processor 134 may be used to execute software, such as software for controlling the off-road vehicles 10, 14 and so forth. Moreover, the processor 134 may include multiple microprocessors, one or more "general-purpose" microprocessors, one or more special-purpose microprocessors, and/or one or more application specific integrated circuits (ASICS), or some combination thereof. For example, the processor 134 may include one or more reduced instruction set (RISC) processors.

The memory device 136 may include a volatile memory, such as random access memory (RAM), and/or a nonvolatile memory, such as ROM. The memory device 136 may store a variety of information and may be used for various purposes. For example, the memory device 136 may store processor-executable instructions (e.g., firmware or software) for the processor 134 to execute, such as instructions for controlling the off-road vehicles 10, 14. The storage device(s) 136 (e.g., nonvolatile storage) may include read-only memory (ROM), flash memory, a hard drive, or any other suitable optical, magnetic, or solid-state storage medium, or a combination thereof. The storage device(s) 136 may store data (e.g., target points, vehicle paths, etc.), instructions (e.g., software or firmware for controlling the off-road vehicle, etc.), and any other suitable data.

In the illustrated embodiment, the steering control system 122 includes a wheel angle control system 138, a differential braking system 140, and a torque vectoring system 142. The wheel angle control system 138 may automatically rotate one or more wheels or tracks of the off-road vehicles 10, 14 (e.g., via hydraulic actuators) to steer the off-road vehicles 10, 14 along the determined path through the field 18. By way of example, the wheel angle control system 138 may rotate front wheels/tracks, rear wheels/tracks, and/or intermediate wheels/tracks of the off-road vehicles 10, 14, either individually or in groups. The differential braking system 140 may independently vary the braking force on each lateral side of the off-road vehicles 10, 14 to direct the off-road vehicles 10, 14 along the determined paths through the field. Similarly, the torque vectoring 142 may differentially apply torque from the engine to wheels and/or tracks on each lateral side of the off-road vehicles 10, 14, thereby directing the off-road vehicle 10, 14 along the determined path through the field. While the illustrated steering control system 122 includes the wheel angle control system 138, the differential braking system 140, and the torque vectoring system 142, it should be appreciated that alternative embodiments may include one or two of these systems, in any suitable combination. Further embodiments may include a steering control system having other and/or additional systems to facilitate directing the off-road vehicles 10, 14 along the determined path through the field (e.g., an articulated steering system, etc.).

In the illustrated embodiment, the speed control system 124 includes an engine output control system 144, a transmission control system 146, and a braking control system 148. The engine output control system 144 is configured to vary the output of the engine to control the speed of the off-road vehicles 10, 14. For example, the engine output control system 144 may vary a throttle setting of the engine, a fuel/air mixture of the engine, a timing of the engine, or a combination thereof, and/or other suitable engine parameters to control engine output. In addition, the transmission control system 146 may adjust gear selection within a transmission to control the speed of the off-road vehicles 10, 14. Furthermore, the braking control system 148 may adjust braking force, thereby controlling the speed of the off-road vehicles 10, 14. While the illustrated speed control system 124 includes the engine output control system 144, the transmission control system 146, and the braking control system 148, it should be appreciated that alternative embodiments may include one or two of these systems, in any suitable combination. Further embodiments may include a speed control system 124 having other and/or additional systems to facilitate adjusting the speed of the off-road vehicle.

As previously discussed, the off-road vehicles 10, 14 are configured to communicate with the base station 38 via the transceivers 104, 106. In the illustrated embodiment, the base station 38 includes a controller 150 communicatively coupled to the base station transceiver 106. The controller 150 is configured to output commands and/or data to the off-road vehicles 10, 14. For example, the controller 150 may provide a series of points or curves to the off-road vehicle 10, 14 via the transceivers 104, 106, from which the vehicles 10. 14 generate planned paths.

In certain embodiments, the controller 150 is an electronic controller having electrical circuitry configured to process data from certain components of the base station 38 (e.g., the transceiver 106). In the illustrated embodiment, the controller 150 includes a processor, such as the illustrated microprocessor 152, and a memory device 154. The processor 152 may be used to execute software, such as software for providing commands and/or data to the off-road vehicle controller 126, and so forth. Moreover, the processor 152 may include multiple microprocessors, one or more "general-purpose" microprocessors, one or more special-purpose microprocessors, and/or one or more application specific integrated circuits (ASICS), or some combination thereof. For example, the processor 152 may include one or more reduced instruction set (RISC) processors. The memory device 154 may include a volatile memory, such as random access memory (RAM), and/or a nonvolatile memory, such as read-only memory (ROM). The memory device 154 may store a variety of information and may be used for various purposes. For example, the memory device 154 may store processor-executable instructions (e.g., firmware or software) for the processor 152 to execute, such as instructions for providing commands and/or data to the off-road vehicle controller 126.

In the illustrated embodiment, the base station 38 includes a user interface 156 communicatively coupled to the controller 150. The user interface 156 is configured to present data from the off-road vehicles 10, 14 and/or the agricultural implements 12, 16 to an operator (e.g., data associated with operation of the off-road vehicles, data associated with operation of the agricultural implements, etc.). The user interface 156 is also configured to enable an operator to control certain functions of the off-road vehicles 10, 14 (e.g., starting and stopping the off-road vehicles, instructing the off-road vehicles to follow a selected/planned route through the field, etc.). In the illustrated embodiment, the user interface includes a display 158 configured to present information to the operator, such as the position of the off-road vehicles 10, 14 within the field, the speed of the off-road vehicle, and the path of the off-road vehicle, among other data. In addition, the user interface 156 (e.g., via the display 158, via an audio system, etc.) is configured to alert an operator if the vehicle 10 and/or 14 substantially diverges from the planned path.

In the illustrated embodiment, the base station 38 includes a storage device 160 communicatively coupled to the controller 150. The storage device 160 (e.g., nonvolatile storage) may include read-only memory (ROM), flash memory, a hard drive, or any other suitable optical, magnetic, or solid-state storage medium, or a combination thereof. The storage devices 160 may store data (e.g., field maps, planned paths or vehicle routes, etc.), instructions (e.g., software or firmware for commanding the off-road vehicle, etc.), and any other suitable data.

While the off-road vehicle control system 102 includes the off-road vehicle controller 126 and the correction path controller 128, it should be appreciated that in alternative embodiments, the control system 102 may include the base station controller 150. For example, in certain embodiments, control functions of the control system 102 may be distributed between the off-road vehicle controller 126, the correction path controller 128, and the base station controller 150. In further embodiments, the base station controller 150 may perform a substantial portion of the control functions of the control system 102. For example, in certain embodiments, the transceiver 104 may output signals to the transceiver 106. In such embodiments, the transceiver 104 may output corresponding signals to the base station controller 150, and the base station controller 150 may determine the appropriate action based on the current state of the off-road vehicles 10, 14 and output a signal indicative of the appropriate action. For example, the controller 150 may output a signal to the user interface 156, instructing the user interface 156 to alert the operator of the off-road vehicle's divergence from the planned path. In addition, the controller 150 may output instructions to the off-road vehicle controller 126 (e.g., via the transceivers 104 and 106), instructing the off-road vehicles 10, 14 and/or the agricultural implements 12, 16 to perform certain operations (e.g., steering control and/or speed control) to guide the off-road vehicles 10, 14 along the planned path or to guide the off-road vehicles 10, 14 back to the planned path.

Also shown are a modular path planning system 162, which will be described if further detail below. The modular path planning system 162 or certain systems of the modular path planning system 162 may be disposed in the vehicles 10, 14, in the base station 38, or in a combination thereof. The modular path planning system 162 may be used to derive a plan that may include for example, swaths and partitions, swath connections, point-to-point plans, and so on, suitable for enabling one or more vehicles, such as the off-road vehicles 10, 14, to simultaneously operate in the field 18 in a more efficient manner.

Figure 3:
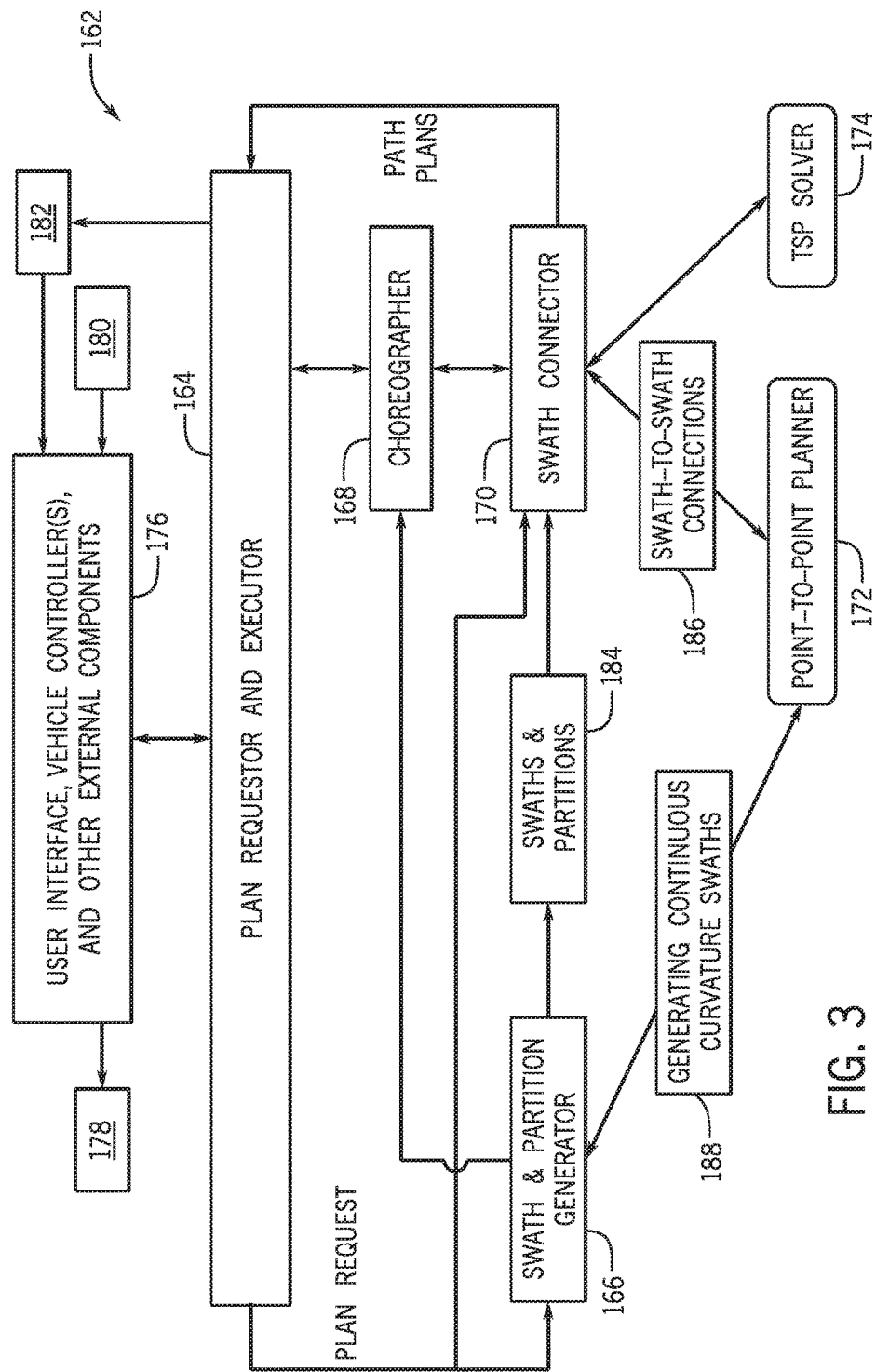
FIG. 3 is bock diagram illustrating an embodiment of a modular path planning system for planning operations of the off-road vehicles of FIG. 1.

FIG. 3 is bock diagram illustrating an embodiment of the modular path planning system 162. In the illustrated embodiment, the modular path planning system 162 includes various subsystems, more specifically, a plan requestor and executor system 164, a swath and partition generator system 166, a choreographer system 168, a point-to-point planner system 172, and a traveling salesman problem (TSP) solver system 174. The system 162 and subsystems 164, 166, 168, 170, 172, and/or 174 may be implemented as computer code or instructions stored in the devices 132, 136, 154, 160 and executable via the processors 130, 134, 152. The subsystems 164, 166, 168, 170, 172, and/or 174 may execute concurrently or sequentially with respect to each other, and may communicate with each other with a variety of techniques, including interprocess communication (IPC) techniques, shared memory, message passing, socket communications, message ques, mapped files, and so on.

In operations, the modular path planning system 162 may interface with various external systems 176, such as controllers (e.g., controllers 126, 128, 150), user interfaces (e.g., user interface 156), and other systems (e.g., weather forecasting systems, dispatch systems). For example, the operator of the off-road vehicles 10, 14 may enter certain information (e.g., as part of a plan request 178) into the plan requestor and executor system 164, such as type of off-road vehicles to be used (e.g., tractor, combine, and so on), manufacturer, vehicle model, vehicle year, vehicle effective width, vehicle turning radius, type of agricultural implements 12, 16 to be used (e.g., planter, fertilizer, seeder, etc.), implement manufacturer, implement year, implement effective width, implement turning radius, and the like.

Other inputs that may be part of the plan request 178 may include a map of the field 18, desired area(s) to cover in the field 18, obstacle boundaries, field 18 boundaries, and so on. Operation information included in the plan request 178 may include the type of operation(s) to be performed (e.g., planting, seeding, tilling, fertilizing, etc.) and details of the operation (e.g., type of seed, type of fertilizer, date and time of day for operations, etc.). Accordingly, the plan request 178 may be transmitted, detailing the aforementioned information.

The modular path planning system 162 may use the plan request 178 as input to derive one or more vehicle plans 180 via the systems 164, 166, 168, 170, 172, and/or 174, as further described below. The vehicle plan(s) 180 may include inter-vehicle coordination suitable for enabling multiple vehicles to operate in the same field, e.g., field 18. The vehicles 10, 14 may then use the vehicle plan(s) 180 to drive and operate in the field 18. For example, the vehicle plan(s) 180 may include partitions, swaths, paths, path segments, and/or driving points to be observed by the vehicles 10, 14. Changes, such as a vehicle 10, 14 undergoing undesired maintenance, weather conditions, obstacle changes (e.g., pond overflowing), and the like, may result in updated plan(s) 182. The updated plan(s) 182 may include a simple reassignment of a swath to another vehicle, may include new swaths to follow, may include evasive actions to take, or may include a complete new vehicle plan. Accordingly, the vehicles 10, 14 may be operated with up-to-date information and may thus cover the field 18 in a more efficient manner.

In order to derive the vehicle plans 180, 182, the modular path planning system 162 may use the plan request 178 to communicate with the swath and partition generator system 166 and the swath connector system 170. The swath partition generator system 166 may apply the plan request 178 to divide the field 18 into one or more partitions and may establish relationships between the partitions, (e.g., Partition A bounds Partition B, Partition B bounds partitions C and D, partition C bounds partition D, Partition D does not bound any partition). In one embodiment, the partitions and their bounding relationships form a directed graph where all the edges are directed from one vertex to another (meaning partition bounds cannot form a loop).

Partitions are comprised of swaths, where a single vehicle/implement may be assigned to a single swath. A swath includes a width at least as wide as the width of the vehicle and/or agricultural implement that will be assigned the swath. The swath and partition generator system 166 receives the information contained in the plan request 178 and creates well-defined swaths and headlands in the field 18. A continuous curvature path is called a swath, and may consist of line segments, arcs, or clothoids. Groups of similar swaths are called swath partitions. The created swaths may include headland/cleanup paths, interior rows, or obstacle cleanup paths and may be grouped into partitions. Swaths are typically assigned to one vehicle, or assigned to several candidate vehicles (for example, when several vehicles have the same coverage width). A partition hierarchy is also generated, which describes how the partitions are related relative to an outward-to-inward spatial relationship; that is, a directed graph that represents to some degree ordering of operations.

Each outer and obstacle boundary in the field 18 has 0 or more headland/cleanup-laps associated with it and the swaths in each lap comprise a single partition. Swaths generated in the interior of the field 18 make up the remaining partitions. For each headland/clean-up partition all the swaths are assigned to a single vehicle, or a list of candidate vehicles. For inner partitions the swaths are staggered on a per vehicle basis. Once the partitions and their associated swaths are created, the information from the original plan request 178 and the partitions are sent to the swath connector system 170.

The swath connector system 170 may receive the plan request 178 and derived swath and partitions 184 and then examines cost constraints in the plan request information 178. Cost constraints may include fuel costs, cost of navigating muddy ground versus rocky ground, seed costs, fertilizer costs, equipment wear and tear costs, travel to starting areas, and so on. With this information, the operations desired dictate a relative ordering (outward-to-inward or inward-to-outward) relationship between the partitions so as to optimize operations.

Once the order of partitions 184 is established, potential swath connections are evaluated; that is, the paths between swath endpoints. A potential swath connection is a path from the end of one swath to an end of another swath such that the vehicle/implement does not collide with any obstacles. Each potential swath connection is assigned a cost based on a weighted average of several subcosts. The subcosts may include time of travel along the path, length of path, length of path not on a road, acceleration/deceleration requirements for travel along the path, amount of trim-back on swath, and so on.

The swath connector system 170 may then formulate the swath connector problem as a traveling salesperson (TSP) problem, where each "city" in the TSP is represented as an end-point of the swath. The purpose of the TSP is to connect the end-points of each swath in the lowest-cost ordering, per the costs listed above. Connections 186 between the swath end-points are made by use of calls to the point-to-point planner system 172, which generates continuous curvature paths (clothoids) 188 between two points. More specifically, point-to-point planner system 172 receives a map, vehicle information, a start pose (position and orientation and curvature) and an end pose (position and orientation ad curvature), and creates a continuous curvature plan between the two poses considering the vehicle 10, 14, information (turn radius, speed, vehicle size) and map (drivable areas, obstacles, and so on).

Once the swath connection problem is formulated as a TSP problem, the problem is then passed to the TSP solver system 174. The TSP solver system 174 may apply a variety of TSP techniques such as Christofides' algorithm, nearest neighbor algorithm, bitonic tour, branch-and-bound algorithms, and so on, to solve the TSP problem either exactly or approximately. Once the TSP solver system 174 returns a solution (e.g., a path from start city to end city), the solution is checked for validity, for example to ensure that all "cities" are presently visited. If more optimization or updated costs are to be calculated, the TSP solver system 174 may be called repeatedly with different initial conditions or costs, until satisfaction criteria are met, thus finding an optimal or near-optimal solution.

The choreographer system 168 may "choreograph" the vehicles 10, 14 to avoid vehicle 10, 14 and/or agricultural implement 12, 16 collisions at path intersections, when traveling in opposite directions on adjacent swaths, and/or when traveling in the same direction over-taking one another. For example, the choreographer system 168 may increase cost, such as a path(s) cost, as the system 168 derives that one or more paths may lead to a collision. The raised cost may then be used to recalculate or otherwise change the path(s) so that collisions may not occur. The choreographer system 168 may be called during a plan execution by the plan requestor and executor system 164 to identify the above problems. The choreographer system 168 may also be called by other subsystems, such as the swath connector 170, to help anticipate any problems present in the current plan, and provide solutions to mitigate any problematic behavior.

Upon the desired level of optimality, the swath connector system 170 returns the path plan 180 for each vehicle 10, 14. The path plan 180 is delivered to the plan requestor and executor system 164, which may then provide the path plan 180 to external systems 176. Likewise, changes to the plan 180 may be similarly computed via the systems 164, 166, 168, 170, 172, 174, resulting in the updated plan 182.

Figure 4:
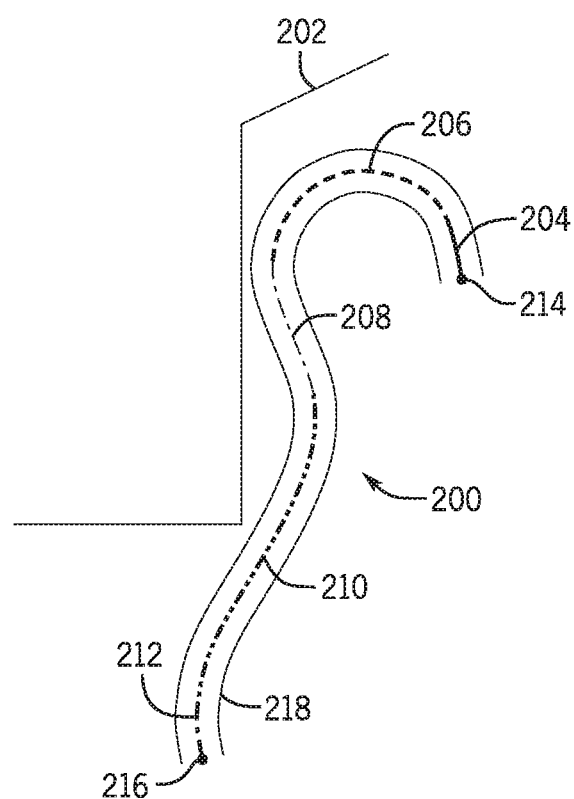
FIG. 4 is a top-down view of an embodiment of a segment of a planned off-road vehicle path that may be planned via the modular path planning system of FIG. 3.
Figure 5:
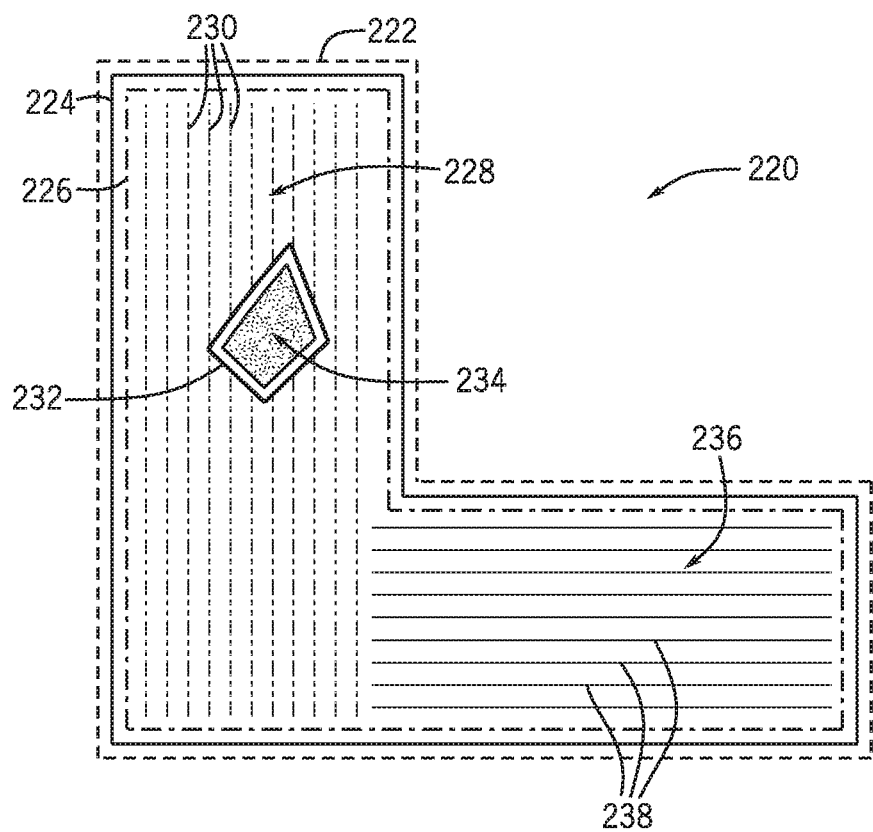
FIG. 5 is the figure illustrates an embodiment of a field that may have been used as input into the modular path planning system of FIG. 3 and subsequently partitioned.

It may be beneficial to illustrate certain path segments, such as an example segment 200 illustrated in FIG. 4, and partitions illustrated in FIG. 5. More specifically, FIG. 4 is a top-down view of a segment 200 of a planned off-road vehicle path 180 and/or 182. In the illustrated embodiment, the path segment 200 is a path through an end-of-row turn that connects the end of one row to the beginning of another row, while avoiding contact with a boundary 202 (e.g., a fence).

In the present embodiment, the path segment 200 includes five discrete clothoid segments 204, 206, 208, 210, 212 that combine to form a continuous path from a starting point 214 to an end point 216. Clothoid segments, also referred to as Euler spirals, are defined as curves with a curvature that changes linearly along the curve length. Put another way, the rate of curvature σ for a given clothoid is constant. Clothoids are C2 continuous and may take into account physical constraints, such as minimum turning radius and maximum turning rate of the vehicle. A clothoid may be defined as a curve having a curvature that varies linearly with curve length. The velocity $(\dot{x}(s), \dot{y}(s))$ at a distance s along the clothoid, may be described by the following equations:

$$\dot{x}(s) = \cos\left(\frac{\sigma}{2}s^2 + \kappa_i s + q_i\right), \quad (1)$$

$$\dot{y}(s) = \sin\left(\frac{\sigma}{2}s^2 + \kappa_i s + q_i\right), \quad (2)$$

where $q_i$ is the initial heading, $\kappa_i$ is the initial curvature, and σ is the rate of change of the curvature with respect to s, the distance along the clothoid. The curvature as a function of s may be described by:

$$\kappa = \sigma s + \kappa_i, \quad (3)$$

The heading as a function of s may be described by:

$$q = \frac{\sigma}{2}s^2 + \kappa_i s + q_i. \quad (4)$$

Thus, the position (x(s), y(s)) may be described by:

$$x(s) = x_i + \int_0^s \cos\left(\frac{\sigma}{2}\tau^2 + \kappa_i \tau + q_i\right)d\tau, \text{ and} \quad (5)$$

$$y(s) = y_i + \int_0^s \sin\left(\frac{\sigma}{2}\tau^2 + \kappa_i \tau + q_i\right)d\tau, \quad (6)$$

where i is path length. Thus, a clothoid segment may be based on initial position, $x_i$ and $y_i$, initial heading, initial curvature, $\kappa_i$, rate of curvature, σ, and path length, s. The capabilities of the vehicles 10, 14 and/or agricultural implements 12, 16 (e.g., minimum turning radius, maximum turning rate) may be taken into account when determining the parameters of the clothoid segments 204, 206, 208, 210, 212. For example, the maximum turning rate (e.g., maximum slew rate) of the vehicle may be proportional to a maximum value for rate of curvature σ. The minimum turning radius may determine a maximum value for curvature κ. It should be appreciated that segments having a constant curvature are clothoids with a rate of curvature σ of zero. Similarly, straight line segments are clothoid segments in which both the curvature κ and the rate of curvature σ are zero. Thus, straight line segments, segments of constant curvature, and segments having a constant rate of curvature may all be defined as clothoid segments. Accordingly, the path segment 200 of five clothoid segments 204, 206, 208, 210, 212 may be parameterized in a single vector:

$$z = [x_0, y_0, q_0, \kappa_0, \sigma_0, s_0, x_1, y_1, q_1, \kappa_1, \sigma_1, s_1, \ldots, x_4, y_4, q_4, \kappa_4, \sigma_4, s_4]^T \quad (7)$$

The off-road vehicle control system 102, the base station controller 150, and/or the modular path planning system 162 may adjust one or more of the initial position x; y; the initial heading q; the initial curvature κ the rate of curvature σ, and the path length s of each segment 204, 206, 208, 210, 212, such that the path segment 200 is C2 continuous. The path segment 200 is C2 continuous when the final position, the final heading, and the final curvature at the end of one segment (e.g., the first segment 204) matches the initial position, the initial heading, and the initial curvature at the start of the proceeding segment (e.g., the second segment 206).

If the vehicle 10 or 14 is at the starting point 214, then the current vehicle state may be used as the initial position, initial heading, and initial curvature of the first clothoid segment 204. Conversely, the parameters of the last segment 212 may be adjusted such that the final position, final heading, and final curvature of the last segment 212 match the final position, final heading, and final curvature of the desired exit state. As previously discussed, the parameters of each segment 204, 206, 208, 210, 212 are adjusted in such a way that the rate of curvature σ does not exceed the vehicle's maximum turning rate, and/or the curvature κ does not fall below the minimum turning radius of the vehicle. Additionally, a minimum segment length (e.g., 10 centimeters) may be used such that the path lengths of each segment 204, 206, 208, 210, 212 remains above the minimum segment length.

The path segment 200 may also be configured to avoid boundaries 202 when generating clothoid segments 204, 206, 208, 210, 212 of the path segment 200 and adjusting the parameters of the segments. In some applications, the implement 12, 16 may be wider than the vehicles 10, 14. In such embodiments, the path segment 200 may include a buffer region 218 on either side of the path segment 200 that may be as wide as or wider than the implements 12 or 16, such that the implements 12 or 16 may be capable of traversing the path segment 200 without coming into contact with the boundary 202.

Turning now to FIG. 5, the figure illustrates an embodiment of a field 220 that may have been used as input as part of the information included in the plan request 178 and subsequently partitioned. The modular path planning system 162 may then partition the field 220 into one or more partitions, among other derived features. In the illustrated embodiment, the field 220 includes an L-shape. The modular path planning system 162 may derive that the field 220 would be more efficiently operated on by respecting multiple partitions. For example, an exterior boundary 222 may be derived. The exterior boundary 222 may define outer bounds of the field 220. Headland partitions 224, 226 may then be derived, suitable for turning around the field 220. Interior partition 228 are also derived, having various rows 230. Inside of the interior partition 228 a headlands obstacle partition 232 is derived, which surrounds an obstacle 234, such as a pond. A second interior partition 236 is also derived, having rows 238 perpendicular to rows 230.

As mentioned previously, an order of operations for the partitions shown may also be derived. For example, a cost function may determine that it may be more efficient, when planting, to plant inside of partitions 228 first, followed by a planting inside partition 236 second. Accordingly, the vehicle plan 180, 182 may follow certain headlands and row orientations in a desired planting order. When harvesting, the order may be different, thus resulting in a harvesting order. Indeed, different operations (e.g., planting, seeding, fertilizing, harvesting), different implements 12, 16, different implement settings, different vehicle 10, 14 types, and so on, may result in different order of partition operations. By deriving multiple partitions, partition types, partition order of operations, swaths, and so on, the techniques described herein may improve planning operations, resulting in a more efficient and productive vehicle plan(s) 180, 182.

Figure 6:
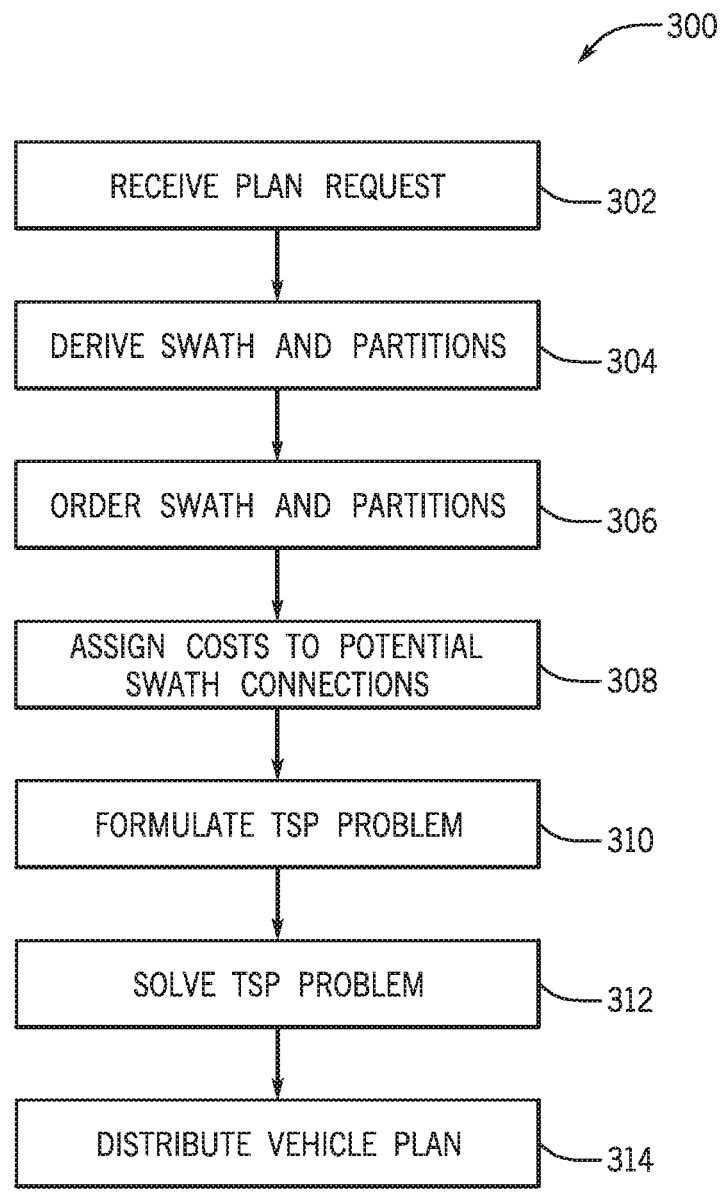
FIG. 6 is a flow chart of an embodiment of process for deriving vehicle plan via the modular path planning system of FIG. 3.

FIG. 6 is a flow chart of an embodiment of a process 300 suitable for deriving the vehicle plan(s) 180 or plan updates 182. The process 300 may be implemented as computer code or instructions, for example, included in the modular path planning system 162 and executable via the processors 150 and/or 102. In the depicted embodiment, the process 300 may receive (block 302) a plan request, such as the request 178. As mentioned previously, the plan request 178 may include the type of off-road vehicles 10, 14 to be used (e.g., tractor, combine, and so on), manufacturer, vehicle model, vehicle year, vehicle effective width, vehicle turning radius, type of agricultural implements 12, 16 to be used (e.g., planter, fertilizer, seeder, etc.), implement manufacturer, implement year, implement effective width, implement turning radius, and the like.

The plan request 178 may additionally include a map of the field 18, desired area(s) to cover in the field 18, obstacle boundaries, field 18 boundaries, and so on. Operation information included in the plan request 178 may include the type of operation(s) to be performed (e.g., planting, seeding, tilling, fertilizing, etc.) and details of the operation (e.g., type of seed, type of fertilizer, date and time of day for operations, etc.). The process 300 may then derive (block 304) a set of swath and partitions. For example, the process 300 may execute the swath and partition generator system 166 to generate one or more partitions and one or more swaths to follow. The partitions may be ordered (block 306), for example hierarchically. For example, The swath partition generator system 166 may apply the plan request 178 to divide the field 18 into one or more partitions and may establish relationships between the partitions, such as bounding relationships (e.g., Partition A bounds Partition B, Partition B bounds partitions C and D, partition C bounds partition D, Partition D does not bound any partition). Accordingly, the partitions may be ordered to form a directed graph where all the edges are directed from one vertex to another (meaning partition bounds cannot form a loop). The edge between two vertices may be a bounding relationship, between two partitions. For the example of Partition A bounds Partition B, Partition B bounds partitions C and D, partition C bounds partition D, Partition D does not bound any partition, the edges may be A→B, B→C, B→D, C→D.

The process 300 may then assign costs (block 308) to potential swath connections. Each potential swath connection (e.g., path between swath start or end points) is assigned a cost based on a weighted average of several subcosts. The subcosts may include time of travel along the path, length of path, length of path not on a road, acceleration/deceleration requirements for travel along the path, amount of trim-back on swath, and so on. The swath connections may be formulated (block 310) as a traveling salesperson (TSP) problem where each where each "city" in the TSP is represented as an end-point of the swath. The purpose of the TSP is to connect the end-points of each swath in the lowest-cost ordering, per the costs listed above. Connections 186 between the swath end-points are made by use of calls to the point-to-point planner system 172, which generates continuous curvature paths (clothoids) 188 between two points. Collision prevention between the vehicles 10, 14 and/or the agricultural implements 12, 16 may be conducted via the choreographer system 168. For example, the choreographer system 168 may prevent collisions at path intersections, when traveling in opposite directions on adjacent swaths, and/or when traveling in the same direction over-taking one another.

The process 300 may then solve the TSP problem (block 312), for example, via a variety of TSP techniques such as Christofides' algorithm, nearest neighbor algorithm, bitonic tour, branch-and-bound algorithms, and so on. The resulting route between "cities" may then be provided (block 314) as part of the vehicle plan(s) 180. The vehicles 10, 14 may receive the plan(s) and may then operate based on the desired routes provided (block 314).

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A path planning system for off-road vehicles, comprising:
   a processor configured to:
     receive, via a plan requestor and executor system, a plan request;
     derive, via a swath and partition generator system, a set of partitions and a set of swaths corresponding to the set of partitions based on the plan request;
     generate a partition hierarchy based on the set of partitions and a map of a field;
     assign, via a swath connector, costs to potential connections between swaths in the set of swaths; and
     derive a first vehicle plan based on the costs to the potential connections between swaths, wherein the first vehicle plan comprises a first path for a first off-road vehicle to operate in the field.

2. The path planning system of claim 1, wherein the processor is configured to derive the first vehicle plan by formulating a traveling salesperson (TSP) problem based on the costs.

3. The path planning system of claim 2, wherein the processor is configured to formulate the TSP problem by deriving a plurality of cities, each city corresponding to an end point of each of the swaths in the set of swaths.

4. The path planning system of claim 3, wherein the processor is configured to formulate the TSP problem by traveling through each city in a lowest-cost ordering based on the costs.

5. The path planning system of claim 1, wherein the costs comprise time of travel along the path, length of the path, length of a portion of the path not on a road, acceleration/deceleration requirements for travel along the path, amount of trim-back on swath, or a combination thereof.

6. The path planning system of claim 1, wherein the first path comprises one or more clothoid segments.

7. The path planning system of claim 1, wherein the path is C2 continuous, and wherein the partition hierarchy generation is based on an outward-to-inward spatial relationship between partitions.

8. The path planning system of claim 1, wherein the processor is configured to derive a second vehicle plan based on the costs to the potential connections between swaths, wherein the second vehicle plan comprises a second path for concurrent operations of the first off-road vehicle and the second off-road vehicle in the field.

9. The path planning system of claim 8, wherein the processor is configured to receive updated data based on current operations of the first off-road vehicle, the second off-road vehicle, or a combination thereof, and to derive an update to the first vehicle plan, the second vehicle plan, or the combination thereof, based on the current operations.

10. A method of path planning for off-road vehicles, comprising:
receiving, via a plan requestor and executor system, a plan request;
deriving, via a swath and partition generator system, a set of partitions and a set of swaths corresponding to the set of partitions based on the plan request;
generating a partition hierarchy based on the set of partitions and a map of a field;
assigning, via a swath connector, costs to potential connections between swaths in the set of swaths; and
deriving a first vehicle plan based on the costs to the potential connections between swaths, wherein the first vehicle plan comprises a first path for a first off-road vehicle to operate in the field.

11. The method of claim 10, wherein deriving the first vehicle plan comprises formulating a traveling salesperson (TSP) problem based on the costs.

12. The method of claim 11, formulating the TSP problem comprises deriving a plurality of cities, each city corresponding to an end point of each of the swaths in the set of swaths.

13. The method of claim 11, wherein each swath comprises a width at least as wide as an agricultural implement included in the first off-road vehicle or being towed by the first off-road vehicle during operations of the first off-road vehicle in the field.

14. The method of claim 11, comprising deriving a second vehicle plan based on the costs to the potential connections between swaths, wherein the second vehicle plan comprises a second path for concurrent operations of the first off-road vehicle and the second off-road vehicle in the field.

15. The method of claim 14, wherein the second path provides for a cost spacing suitable for increased cost as the first and the second off-road vehicles come closer together.

16. A tangible, non-transitory computer readable medium comprising instructions configured to:
receive a plan request;
derive a set of partitions and a set of swaths corresponding to the set of partitions based on the plan request;
generate a partition hierarchy based on the set of partitions and a map of a field;
assign costs to potential connections between swaths in the set of swaths; and
derive a first vehicle plan based on the costs to the potential connections between swaths, wherein the first vehicle plan comprises a first route for a first off-road vehicle to operate in the field.

17. The tangible, non-transitory computer readable medium comprising instructions of claim 16, wherein the instructions configured to derive the first vehicle plan comprise instructions configured to formulate a traveling salesperson (TSP) problem based on the costs.

18. The tangible, non-transitory computer readable medium comprising instructions of claim 17, wherein the instructions are configured to formulate the TSP problem by deriving a plurality of cities, each city corresponding to an end point of each of the swaths in the set of swaths.

19. The tangible, non-transitory computer readable medium comprising instructions of claim 16, wherein the costs comprise time of travel along the path, length of the path, length of a portion of the path not on a road, acceleration/deceleration requirements for travel along the path, amount of trim-back on swath, or a combination thereof.

20. The tangible, non-transitory computer readable medium comprising instructions of claim 16, wherein the instructions are configured to derive a second vehicle plan based on the costs to the potential connections between swaths, wherein the second vehicle plan comprises a second path for concurrent operations of the first off-road vehicle and the second off-road vehicle in the field.

* * * * *